N. Smith.
Spring Scales.
No. 38,511. Patented May 12, 1863.

Witnesses:
J. W. Coombs
Geo. Reel

Inventor:
Nicholas Smith
per Munn & Co.
Attorneys

UNITED STATES PATENT OFFICE.

NICHOLAS SMITH, OF LANSING, IOWA.

IMPROVEMENT IN APPARATUS FOR MEASURING AND WEIGHING.

Specification forming part of Letters Patent No. 38,511, dated May 12, 1863.

*To all whom it may concern:*

Be it known that I, NICHOLAS SMITH, of Lansing, in the county of Alamakee and State of Iowa, have invented a new and useful Combination of a Measure and Weighing Device; and I do hereby declare that the following is a full, clear, and exact description of the same, reference being had to the accompanying drawings, making a part of this specification, in which—

Figure 1:
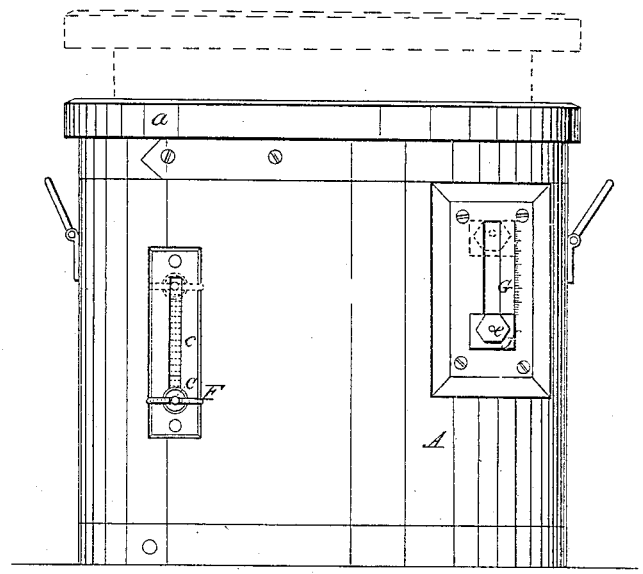
Figure 2:
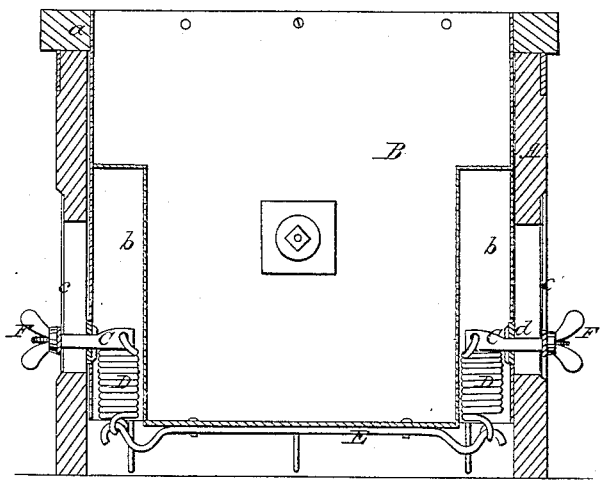

Figure 1 is a side view of my invention; Fig. 2, a vertical central section of the same.

Similar letters of reference indicate corresponding parts in the two figures.

This invention consists in the application of a weighing attachment to a measure of capacity, (a half-bushel, for instance,) the parts being arranged in such a manner that grain or other articles may be measured and weighed simultaneously or separately, as desired.

To enable those skilled in the art to fully understand and construct my invention, I will proceed to describe it.

A represents a case, which may be of cylindrical form, constructed of wood, and open at both ends.

B is a measure, also of cylindrical form, and of such diameter that it may fit snugly within A, and still rise and fall freely within it.

The measure B may be constructed of sheet metal, and at its upper edge it has a wooden rim or flange, *a*, attached to it, the upper surface of said rim or flange being inclined to admit of any grain which may fall upon it passing off by its own gravity, the rim or flange projecting over or beyond the side of the case in order to prevent any grain getting between the case and measure. The case A is a trifle longer or deeper than the measure B, and it has two recesses or chambers, *b b*, formed in its side at opposite points. These recesses or chambers do not communicate with the interior of the measure, and they may be formed by brazing or otherwise securing semicircular plates or tubes to the inner side of the measure, and slotting or cutting out the metal of the measure in front of the tubes, so as to admit of horizontal bars C passing into them. (See Fig. 2.) In each of the recesses or chambers *b* there is placed a spiral spring, D, the lower ends of which are attached to the ends of a bar, E, the latter being firmly secured to the bottom of the measure. The upper ends of the springs D D are connected to the bars C, which pass through the case A and through vertically-slotted plates *c c*, attached thereto. On the outer parts of the bars C there are cut screw-threads to receive thumb-nuts F, by screwing up which the upper ends of the springs may be retained at any desired point, each bar C having a shoulder or plate, *d*, upon it, which bears against the inner side of the case. (See Fig. 2.)

To the measure B there are attached two short horizontal bars, *e*, which pass through the case A, and also through slotted plates G, attached thereto, and on each bar *e*, at the outer side of its plate G, there is fitted an index, *f*.

The bars *e*, besides serving as index-arms, also serve as guides for the measure, and one or both of the plates G are graduated like the index side of an ordinary spring-balance, so that the indexes *f* may indicate the number of pounds and fractional parts thereof. (See Fig. 1, in which one of the weight-indicating devices is shown.)

From the above description it will be seen that as the measure B is filled it will gradually lower, the springs D being distended under the weight, and the weight indicated by the indexes *f* on the plates G, and in case the springs D should become stretched the bars G are raised by unscrewing the nuts F, and the indexes adjusted again at the zero-point on the plate G. If the weighing attachment is not required, the measure may be let down until the rim or flange *a* rests on the top of the case A, and the device may then be used as an ordinary measure, and it will, of course, be seen that the device, when the measure is elevated and properly adjusted, may be used as a simple weighing device without regard to measurement, or articles may be measured and weighed simultaneously.

I would remark that this device is not confined to the cylindrical form, although that form would be preferable.

Having thus described my invention, what I claim as new, and desire to secure by Letters Patent, is—

A measure of capacity, B, fitted within a case, A, and having springs D (one or more) applied to it, and also an index or indexes to travel over graduated plates G on the outer side of the case, all arranged substantially as and for the purpose herein set forth.

NICHOLAS SMITH.

Witnesses:
O. S. CONKEY,
PETER JONES.